March 6, 1928. 1,661,236

H. SEBELL

WINDOW WASHING DEVICE

Filed March 12, 1925  3 Sheets-Sheet 1

Inventor.
Harry Sebell
by Heard Smith & Tennant.
Attys.

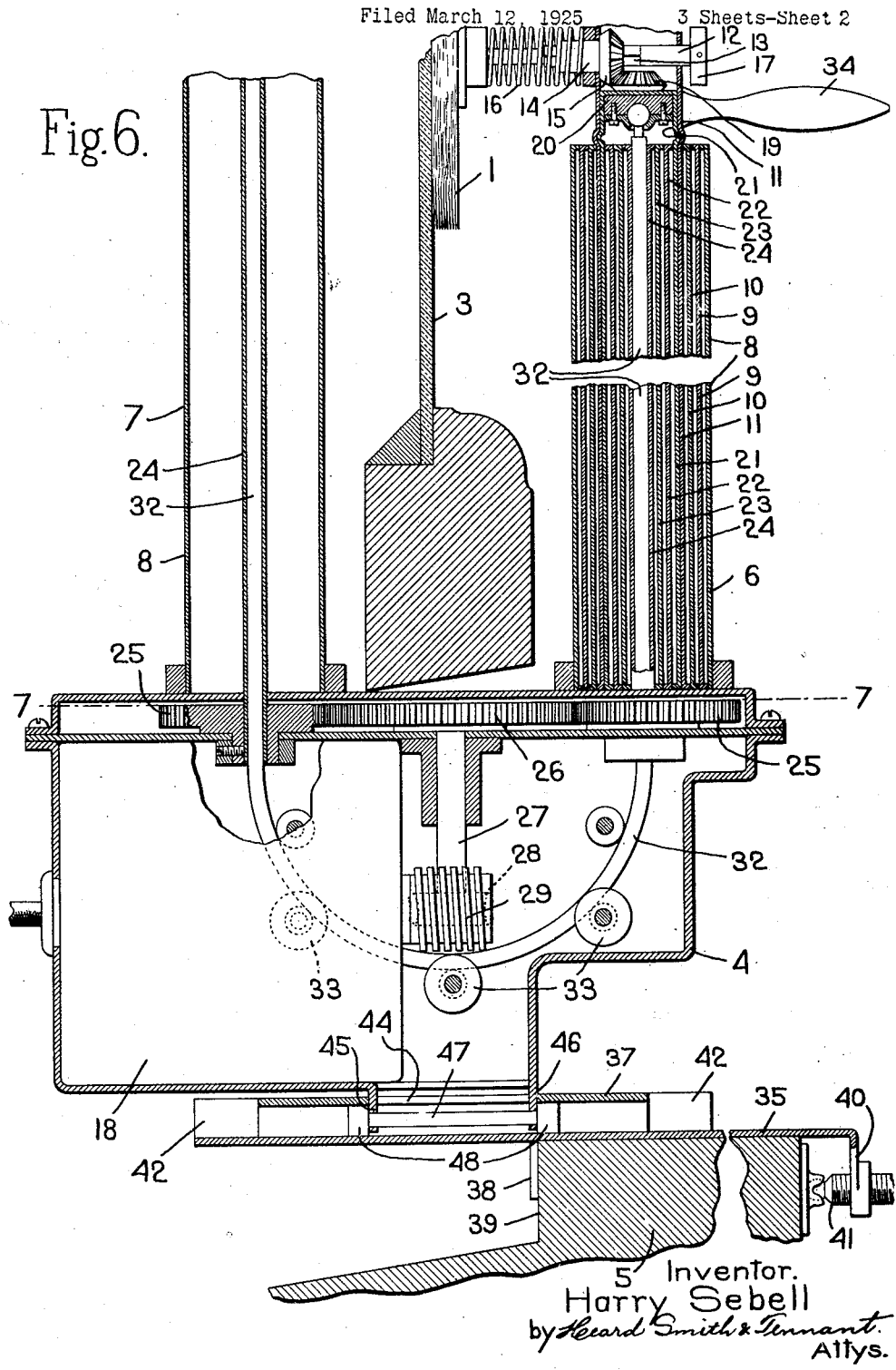

March 6, 1928.  1,661,236

H. SEBELL

WINDOW WASHING DEVICE

Filed March 12, 1925   3 Sheets-Sheet 3

Inventor.
Harry Sebell,
by Heard Smith & Tennant
Attys.

Patented Mar. 6, 1928.

1,661,236

UNITED STATES PATENT OFFICE.

HARRY SEBELL, OF BOSTON, MASSACHUSETTS.

WINDOW-WASHING DEVICE.

Application filed March 12, 1925. Serial No. 14,885.

This invention relates to a device for cleaning windows and has for its principal object to provide a novel device whereby both sides of a window pane can be cleaned simultaneously. A device embodying my invention comprises two wipers or cleaning elements and a supporting frame carrying said wipers and constructed so that when it is in use the wipers are supported on and engage opposite sides of the window pane to be cleaned. The wipers are connected together so that they are moved simultaneously.

In using the device it is placed in position and the operator manipulates the wiper on one side of the pane to clean the glass and this movement will impart a simultaneous movement to the other wiper on the other side of the pane so that both sides of the pane are cleaned simultaneously.

In order to give an understanding of the invention I have illustrated in the drawings a selected embodiment thereof which will now be described after which the novel features will be pointed out in the appended claims.

Fig. 1 of the drawings illustrates a device embodying my invention showing it in use;

Fig. 6 is an enlarged sectional view through the base portion of the supporting frame showing one of the supporting arms in its contracted relation and illustrating the manner of attaching the frame to the window sill;

My improved window cleaning device comprises two cleaners or wiping elements together with a supporting frame adapted to support said cleaners on opposite sides of the window pane to be washed or cleaned. The supporting frame is preferably a forked structure which can be clamped to the window sill and the arms of which are situated on opposite sides of the window pane. The arms are also preferably extensible and contractible so that the cleaner elements may be moved up and down and I propose to so connect the cleaner elements that they will move simultaneously so that when the operator manipulates one cleaner element for cleaning one side of the window pane the other element is moved simultaneously to clean the other side of the window pane.

Figure 2:
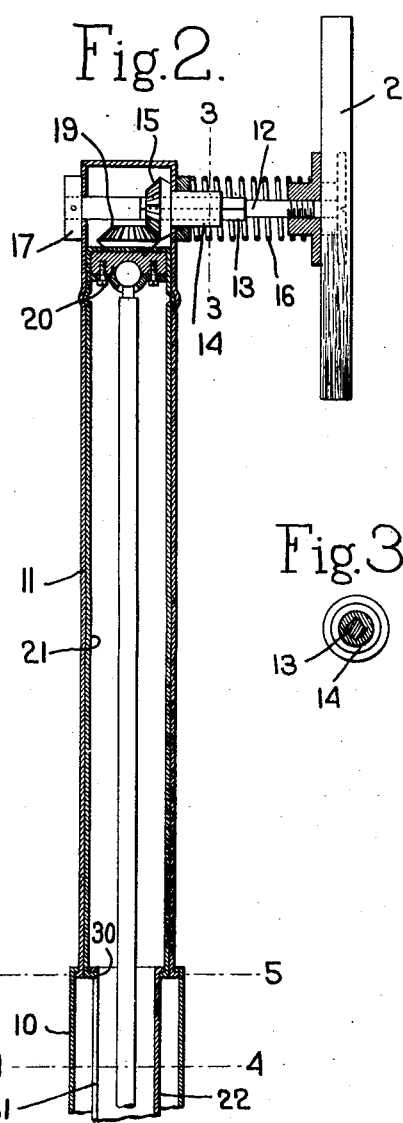
Fig. 2 is an enlarged sectional view through one of the wipers and a portion of the telescopic arm on which it is supported.
Figure 3:
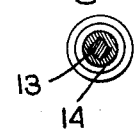
Fig. 3 is a section on the line 3—3, Fig. 2.
Figure 4:
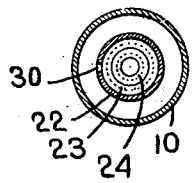
Fig. 4 is a section on the line 4—4, Fig. 2.
Figure 5:
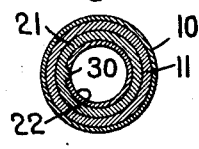
Fig. 5 is a section on the line 5—5, Fig. 2.
Figure 1:
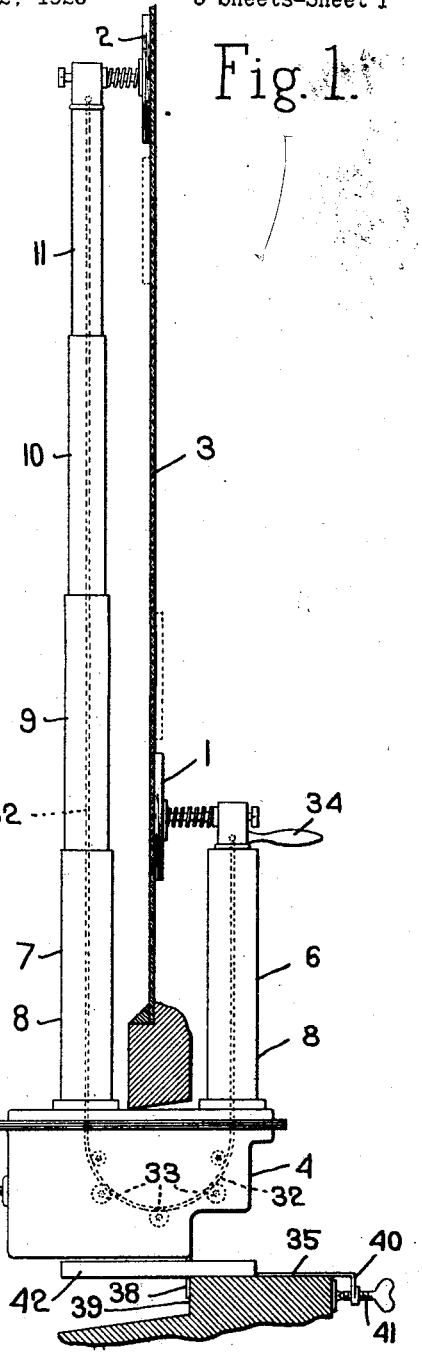
Figure 7:
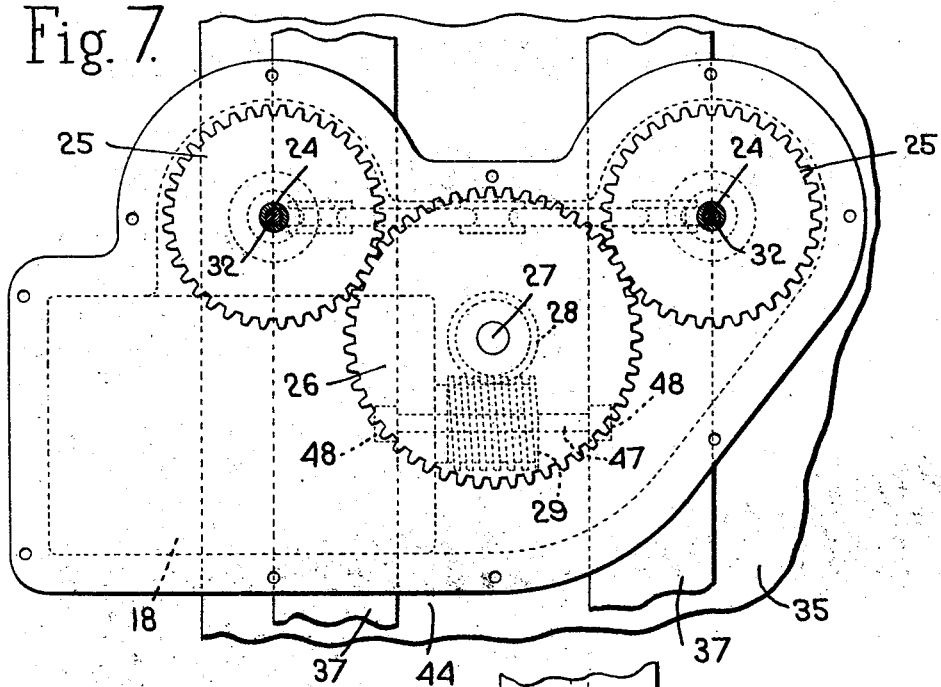
Fig. 7 is a section on the line 7—7, Fig. 6.

The two cleaner elements are shown in Fig. 1 at 1 and 2 respectively, 3 being the window pane which is to be cleansed. These cleaner elements are carried on a supporting frame which comprises a base portion 4 adapted to be clamped to the window sill 5 and which comprises two arms 6 and 7, each of which is preferably extensible and contractible. The extensibility of the arms may be provided for by making them in sections which have a telescopic relation, the arm 7 which is extended comprising a lower portion 8 which is rigid with the base 4 and a pluralty of other sections 9, 10, 11 which have a telescopic relation and which can be telescoped into the base section 8. The arm 6 has a similar construction.

The cleaners 1 and 2, which may have any suitable construction, are preferably rotatively mounted and means are provided for rotating them simultaneously. The cleaners are also connected so that when the cleaner 1 is moved up or down the cleaner 2 will have a down or up movement in the opposite direction. Each cleaning element is carried by a shaft 12 which is journalled in the upper part of the supporting arm. Each shaft 12 is shown as provided with a squared portion 13 which extends through the hub 14 of a bevelled gear 15 which is journalled in the upper end of the supporting arm. A spring 16 is employed between the arm and the cleaner for yieldingly pressing the cleaning element against the pane 3. The shaft 12 extends through the arm and is provided with a collar 17 which limits the spring impelled movement of the shaft 12.

With this construction the rotation of the gear 15 will rotate the cleaner element 2 but the latter can move in the direction of the axis of the shaft and thus will be yieldingly pressed against the pane 3.

The gear 15 for each cleaner is operated from a motor 18 mounted in the base portion 4 of the supporting frame and I have herein provided a telescopic driving connection between the motor and the gear 15. Each gear 15 meshes with a bevelled gear 19 which is secured to a head 20 at the upper end of a tubular shaft section 21 which is located within the arm section 11. This tubular shaft section 21 telescopes over a similar tubular shaft section 22 which is located within the arm section 10 and the shaft section 22 in turn telescopes over another section shaft 23 which is situated within the arm section 9. The shaft section 23 in turn telescopes over a shaft section 24 which is situated within the arm section 8. The lower end of the shaft section 24 has fast thereon a gear 25 which meshes with a gear 26 on a vertical shaft 27, the latter shaft having a worm gear 28 thereon which meshes with and is driven by the worm 29 on the motor shaft.

The shaft sections 21, 22, 23 and 24 are splined together so that they are compelled to rotate in unison although they have a telescopic movement. The shaft section 21, for instance, has at its lower end an inwardly directed lug 30 which operates in a slot 31 extending longitudinally of the shaft section 22 so that the shaft section 21 can slide over the section 22 but the two sections must rotate together. The same sort of driving connection is employed between all the various shaft sections.

A similar construction is employed for operating the cleaner element 1 and thus the motor 18 when operating will rotate both cleaners simultaneously.

The two heads 20 of the two cleaners are connected by a flexible wire connection 32 which is situated centrally of the telescoping driving shaft, all sections of which shaft are tubular. This flexible wire extends through the bottom casing 4 and is guided by suitable guide rolls 33.

The upper section of the arm which is situated on the inside of the pane is provided with a handle 34 by which it may be manipulated. With the construction above described it will be apparent that when the cleaner 1 is moved up and down by the handle 34 the cleaner 2 will be moved simultaneously but in an opposite direction through the medium of the flexible connection 32. This connection, as stated above, is in the form of a flexible resilient wire or rod which is stiff enough so that when the handle 34 is pushed downwardly the wiper element 2 will be raised.

The supporting frame is also mounted so that it can be rocked thereby giving the wipers a horizontal movement, such movement of both wipers being simultaneous and in the same direction.

Provision is also made for adjustably mounting the base 4 on the window sill so that it may be moved horizontally as necessary to enable the cleaners or wipers to reach all parts of the window pane 3.

The base 4 is shown as carried by a supporting member which comprises a lower plate 35 that is clamped to the window sill 35 and an upper guiding plate 37 which is carried by the plate 35 but is adjustable thereon. The plate 35 rests on the window sill 36 and has two ears 38 depending therefrom which engage the outer face 39 of the window sill and another ear 40 carrying a clamping screw 41 which is adapted to be clamped against the front face of the window sill. By this means the lower plate 35 is clamped in place. This plate has its side edges upturned as shown at 42 and the upper plate 37 is provided with downturned edges 43 which fit within the upturned edges 42. The plate 37 is thus retained in position but can be shifted on the plate 35.

Figure 8:
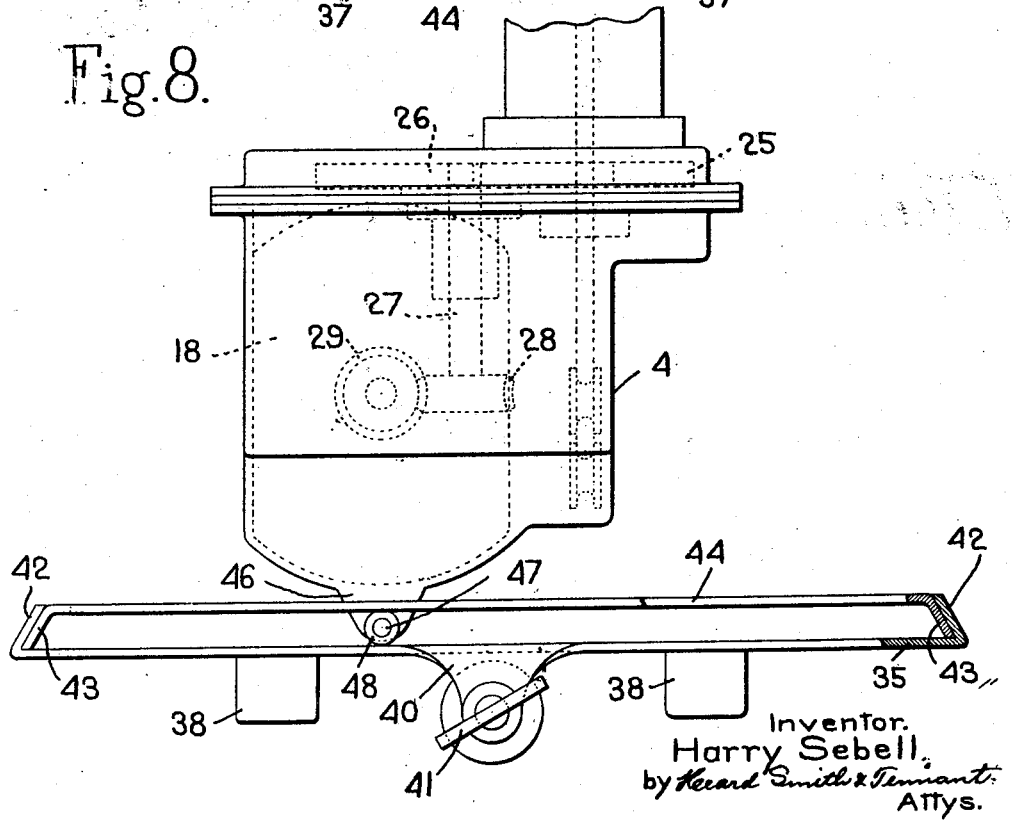
Fig. 8 is a front view of the base of the supporting frame.

The plate 37 is provided with a slot 44 in which is received two down-turned ears 45, 46 depending from the base portion 4 of the frame. Journalled in these ears is a rod 47 carrying two rolls 48. These rolls fit between the plates 35 and 37 as shown clearly in Figs. 6 and 8. This shaft or rod 47 provides a pivotal support for the base 4 which allows the forked frame to be swung horizontally about the pivot. The frame can also be shifted longitudinally of the slot 44 thereby to shift the forked arm toward either side edge of the window. By means of this sliding and pivotal connection between the forked frame and the supporting plates it is possible to shift the position of the forked frame so as to enable the cleaners to reach all parts of the window pane.

The adjustment between the two plates 37 and 35 provides for placing the forked frame in the correct position so that the window pane will be received between the cleansers.

My device can be readily clamped to any window sill and can be easily adjusted to fit the window after which the cleaning operation involves merely the manipulation of the cleaner on the inside of the window, the other cleaner being simultaneously moved to clean the outside of the window.

The cleaners may be of any suitable construction and may be used either wet or dry as desired.

While I have illustrated a selected embodiment of my invention I do not wish to be limited to the constructional features shown.

I claim:

1. In a window cleaner, the combination with two cleaning elements, of means for supporting said elements on opposite sides of a window pane to be cleaned, means for rotating said elements simultaneously and means for moving said elements simultaneously in opposite directions.

2. In a window cleaner, the combination with two cleaner elements, of a forked supporting frame for supporting the elements on opposite sides of the window to be cleaned, means for rotating said cleaner elements simultaneously and means for moving said elements bodily in opposite directions.

3. In a window cleaner, the combination with two cleaning elements, of a forked supporting frame for supporting said elements on opposite sides of a pane to be cleaned, the arms of the forked frame being extensible and contractible and means for simultaneously extending one arm and contracting the other.

4. In a window cleaner, the combination with two cleaning elements, of a forked supporting frame for supporting said elements on opposite sides of a pane to be cleaned, the arms of the forked frame being extensible and contractible, and a connection between said elements, whereby when one arm is contracted the other is extended.

5. In a window cleaner, the combination with two cleaning elements, of a forked supporting frame for supporting said elements on opposite sides of a pane to be cleaned, the arms of the forked frame being extensible and contractible, a connection between said elements, whereby when one arm is contracted the other is extended, and means to rotate the cleaner elements.

6. In a window cleaner, the combination with a forked supporting frame, of means to secure said frame to a window sill with the arms of the fork on opposite sides of the window pane to be cleaned, a cleaner element carried by each arm, means to rotate the cleaner elements simultaneously and means to move them bodily in opposite directions as they rotate.

7. In a window-cleaning device, the combination with a forked supporting frame, the arms of which are extensible and contractible of a supporting member adapted to be clamped to the window sill, means for pivotally connecting said forked frame to the supporting member with the arms of the fork on opposite sides of the window pane, cleaner elements carried by said arms and means to extend one arm and simultaneously contract the other.

8. In a window-cleaning device, the combination with a forked supporting frame, of a supporting member adapted to be clamped to the window sill, means for pivotally connecting said forked frame to the supporting member with the arms of the fork on opposite sides of the window pane, cleaner elements carried by said arms, and a connection between the cleaner elements whereby when one arm is extended the other is contracted.

In testimony whereof, I have signed my name to this specification.

HARRY SEBELL.